United States Patent
Hirata

(10) Patent No.: US 6,428,095 B1
(45) Date of Patent: Aug. 6, 2002

(54) SEAT WITH SEAT SENSOR

(75) Inventor: Yutaka Hirata, Kanagawa (JP)

(73) Assignee: Bridgestone Corporation, Tokyo (JP)

( * ) Notice: Subject to any disclaimer, the term of this patent is extended or adjusted under 35 U.S.C. 154(b) by 184 days.

(21) Appl. No.: 09/116,906

(22) Filed: Jul. 17, 1998

(30) Foreign Application Priority Data

Jul. 24, 1997 (JP) ............................................. 9-198413

(51) Int. Cl.$^7$ ............................................. A47C 31/00
(52) U.S. Cl. .................................. 297/217.3; 297/452.2
(58) Field of Search ...................... 297/180.11, 180.12, 297/217.3, 452.26, 452.27; 340/667; 200/854

(56) References Cited

U.S. PATENT DOCUMENTS

| | | | |
|---|---|---|---|
| 4,865,379 A | * 9/1989 | Aoki et al. | 297/180.12 X |
| 5,113,176 A | * 5/1992 | Harris | 340/667 X |
| 5,120,980 A | * 6/1992 | Fontaine | 200/85 A X |
| 5,446,391 A | 8/1995 | Aoki et al. | |
| 5,467,022 A | 11/1995 | Aoki et al. | |
| 5,474,327 A | * 12/1995 | Schousek | 280/735 |
| 5,612,876 A | * 3/1997 | Zeidler et al. | 280/730.1 |
| 5,739,757 A | * 4/1998 | Gioutsos | 280/735 |
| 5,810,392 A | * 9/1998 | Gagnon | 280/735 |

FOREIGN PATENT DOCUMENTS

| | | |
|---|---|---|
| DE | 42 37 072 | 12/1993 |
| DE | 94 14 164 | 11/1994 |
| DE | 44 17 827 | 11/1995 |
| EP | 0 345 806 | 12/1989 |
| EP | 0 785 101 | 7/1997 |
| GB | 1 467 769 | 3/1977 |

* cited by examiner

Primary Examiner—Anthony D. Barfield
(74) Attorney, Agent, or Firm—Kanesaka & Takeuchi

(57) ABSTRACT

A seat with a seat sensor is formed of a pressure sensitive sheet sensor for sensing a presser, and a seat pad for allowing a user to sit thereon. The seat pad has a slit extending from one peripheral side of the seat pad to a middle area of the seat pad. The slit has a with and a height to allow the sheet sensor to enter from the one peripheral side to the middle thereof so that the sheet sensor is disposed inside the seat pad. The seat with the seat sensor can be easily manufactured.

2 Claims, 5 Drawing Sheets

SEAT WITH SEAT SENSOR

FIELD OF THE INVENTION

The present invention relates to a seat with a sheet-like sensor which detects whether an occupant is seated in the seat.

DESCRIPTION OF PRIOR ART

A sensor for preventing malfunction of a passenger air bag is known, which is provided on the upper surface of a vehicle seat cushion. FIGS. 5 and 6 are sectional views showing conventional examples each of which comprises a pad 1' and a sensor 2' bonded on the pad 1'. For eliminating bad touch due to the presence of the sensor, a slab 3 of about 5 mm in thickness is bonded to cover the sensor 2' as shown in FIG. 5 or a frame laminate 4 of 5 mm in thickness is provided as shown in FIG. 6.

Such a conventional seat in which the sensor 2' is bonded and the slab 3 or the frame laminate 4 is provided to cover the sensor 2' has disadvantages in that many laminating steps are required and cost is increased due to the laminating.

OBJECT AND SUMMARY OF THE INVENTION

It is an object of the present invention to solve the above disadvantages and to provide a seat with a seat sensor which allows easy manufacture and substantially completely eliminates the bad touch due to the presence of the sensor.

A seat with a seat sensor of the present invention comprises a soft pad and a pressure sensitive sheet-like sensor for detecting a human body seated on the pad wherein the sensor is disposed inside the pad.

Since the sensor is disposed inside the pad, the aforementioned seat with the seat sensor can substantially completely eliminate bad touch due to the presence of the sensor and also eliminate the necessity of providing a slab and a laminate for covering the sensor, thereby allowing easy manufacture and reducing the manufacturing cost.

In one embodiment of the present invention, the pad is provided with a slit for the sensor formed from a side (any one of front, rear, right, and left sides) toward the center of the pad and the sensor is inserted into the slit.

In another embodiment of the present invention, the pad is provided with a cavity formed upward from the bottom of the pad, a soft member is inserted into the cavity, and the sensor is disposed between the top surface of the soft member and the ceiling of the cavity. In this case, the cavity may be formed in such a manner that the lower end thereof is narrower, thereby preventing the soft member from coming off.

DESCRIPTION OF PREFERRED EMBODIMENTS

Hereinafter, embodiments of the present invention will be described with reference to the attached drawings.

Figure 1A:
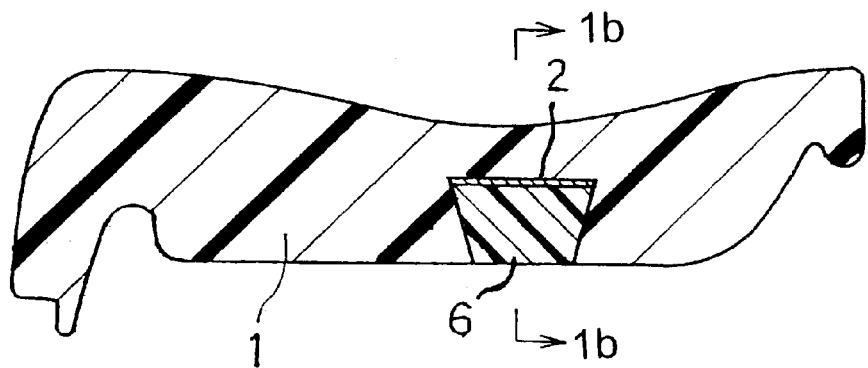
FIGS. 1a, 1b and 1c are sectional views showing a seat with a seat sensor according to an embodiment.
Figure 1B:
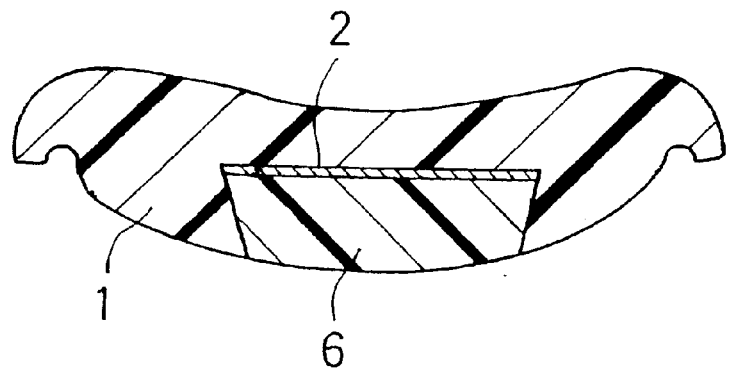
Figure 1C:
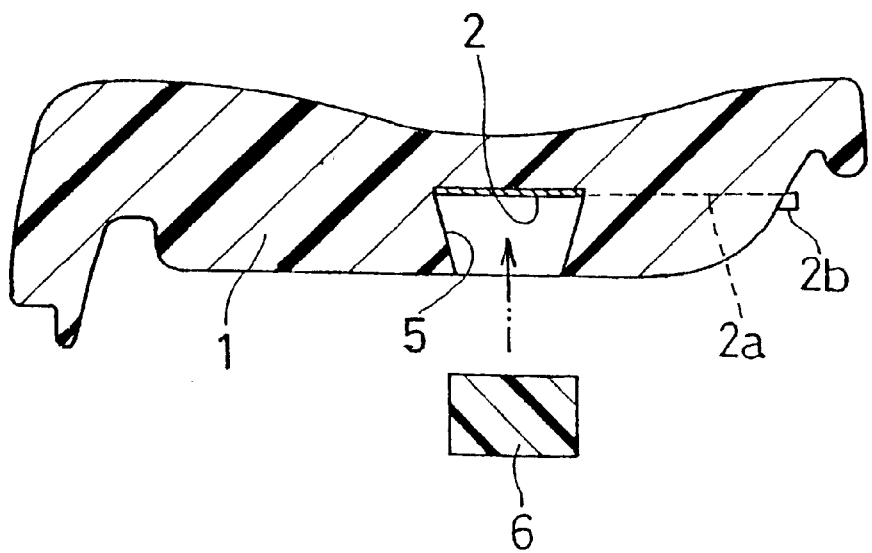

FIGS. 1a, 1b and 1c are sectional views showing a seat with a seat sensor according to an embodiment of the present invention, FIG. 1a is a sectional view taken in the back-and-forth direction, FIG. 1b is a sectional view taken along the line 1b—1b of FIG. 1a, and FIG. 1c is an exploded structural view.

In this embodiment, a pad 1 is provided with a cavity 5 which is formed in the bottom to extend upward and in which a sensor 2 is attached to the ceiling thereof. Filled in the cavity 5 is a slab 6 made of the same soft material as the pad 1 (molded soft polyurethane foam may be used). The sensor 2 may be bonded onto the ceiling of the cavity 5 with an adhesive agent or adhesive tape. Alternatively, the sensor may be bonded on the top of the slab 6. As shown in FIG. 1c, it is preferable that the sensor 2 is previously bonded to the ceiling of the cavity 5 and a cable 2a connected with the sensor 2 is extended to the rear end of the pad 1 in such a manner that a terminal 2b disposed at an end of the cable projects from the rear end of the pad 1.

In this embodiment, the cavity 5 is formed in a taper configuration in such a manner that the lower portion is narrower so that the slab 6 inserted into the cavity 5 is held in the cavity 5 and is prevented from coming off.

Figure 2A:
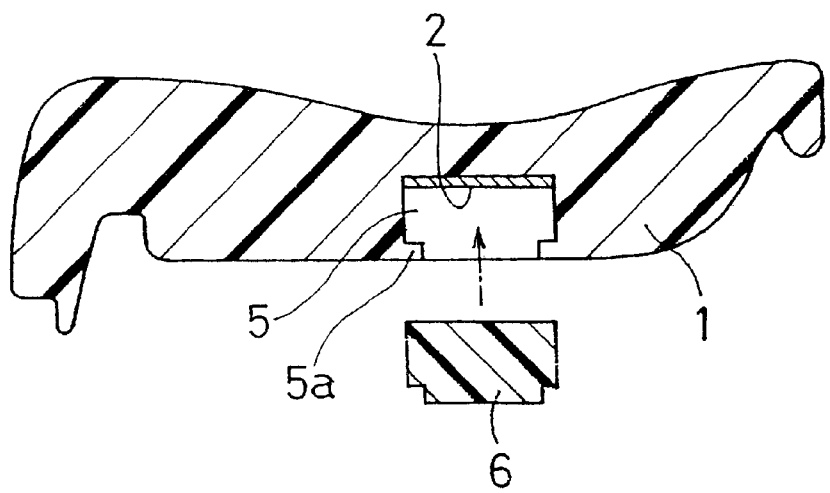
FIGS. 2a and 2b are sectional views each showing a seat with a seat sensor according to another embodiment.
Figure 2B:
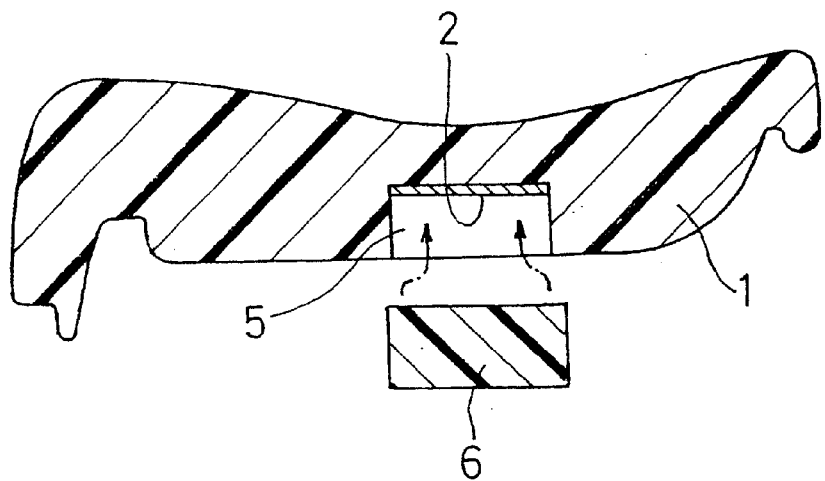

FIGS. 2a and 2b show other embodiments of the present invention. In FIG. 2a, the cavity 5 is provided with a protrusion 5a around the opening thereof so that the lower periphery of the slab 6 is engaged with the protrusion 5a, thereby preventing the slab 6 from coming off. In FIG. 2b, a used slab 6 is slightly larger than the cavity 5 so that the slab 6 is pressed into the cavity 5 in the elastically compressed state, thereby preventing the slab 6 from coming off.

Figure 7:
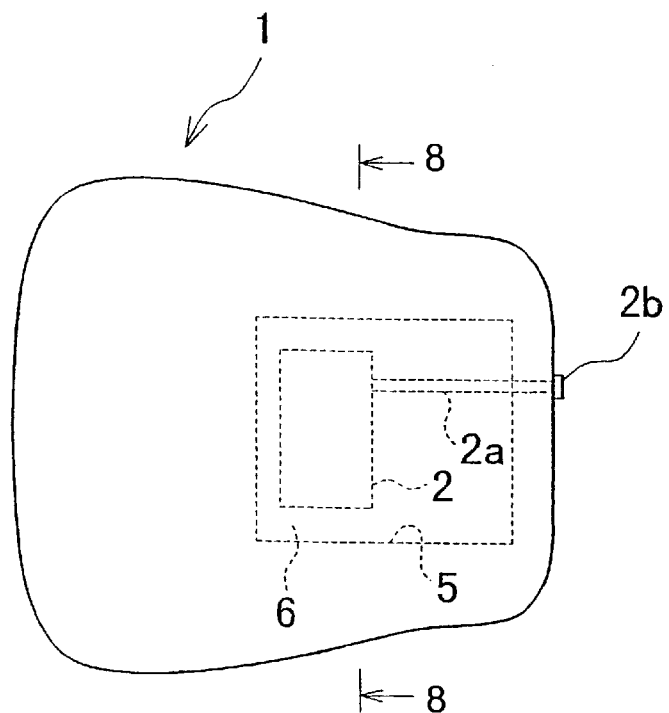
FIG. 7 is a plane view of a seat with a seat sensor according to another embodiment.
Figure 8:
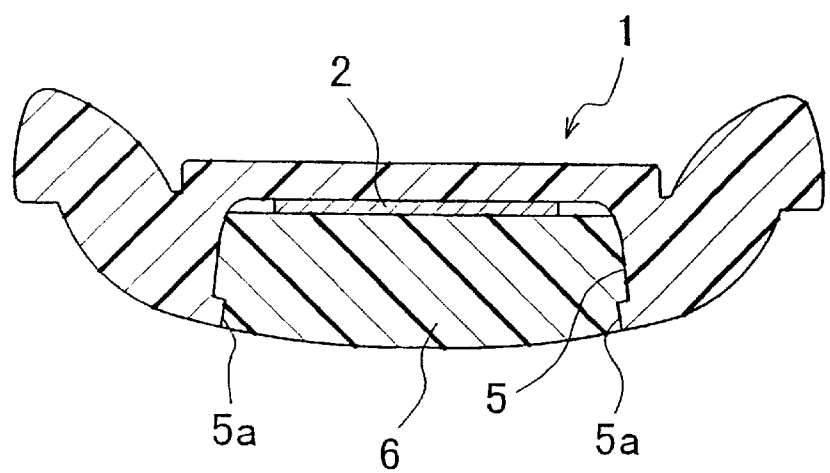
FIG. 8 is a sectional view taken along the line VIII—VIII of FIG. 7.

Though the sensor 2 has substantially the same size as the area of the ceiling of the cavity 5 in FIGS. 1a, 1b, 1c, 2a and 2b, it should be understood that the size of the sensor 2 may be smaller than the ceiling of the cavity 5 as shown in FIGS. 7 and 8.

Figure 3A:
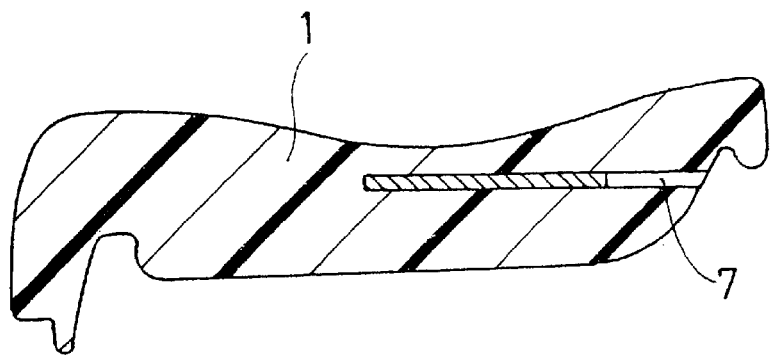
FIGS. 3a and 3b are sectional views showing a seat with a seat sensor according to further different embodiment.
Figure 3B:
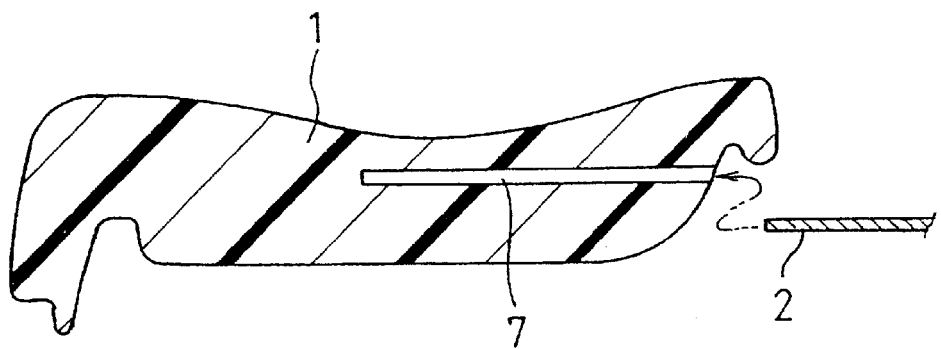

FIG. 3a is a sectional view of a seat with a seat sensor according to a further different embodiment of the present invention and FIG. 3b is an exploded view thereof. In this embodiment, the pad 1 is provided with a slit 7 extending forward from the rear end, into which the sensor 2 is inserted. In this case, the slit 7 is provided in a substantially horizontal direction so that the sensor 2 never comes off the slit 7 even without closing the opening of the slit 7. However, a sheet-like slab may be pressed into the slit 7 to prevent the sensor 2 from coming off.

Figure 4:
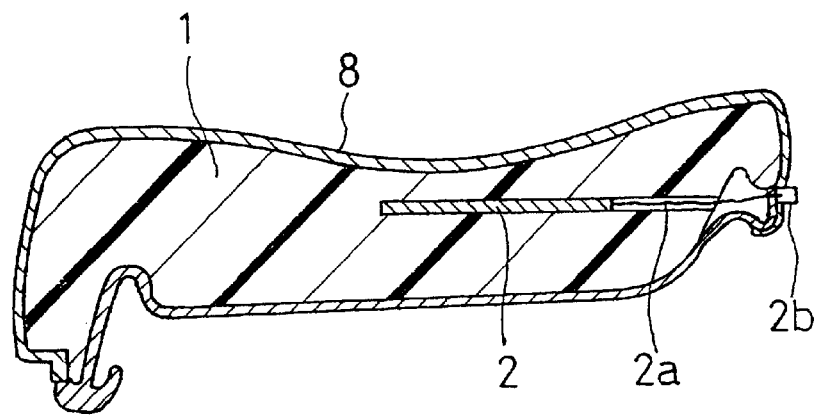
FIG. 4 is a structural view of a seat with a seat sensor according to still further different embodiment.
Figure 5:
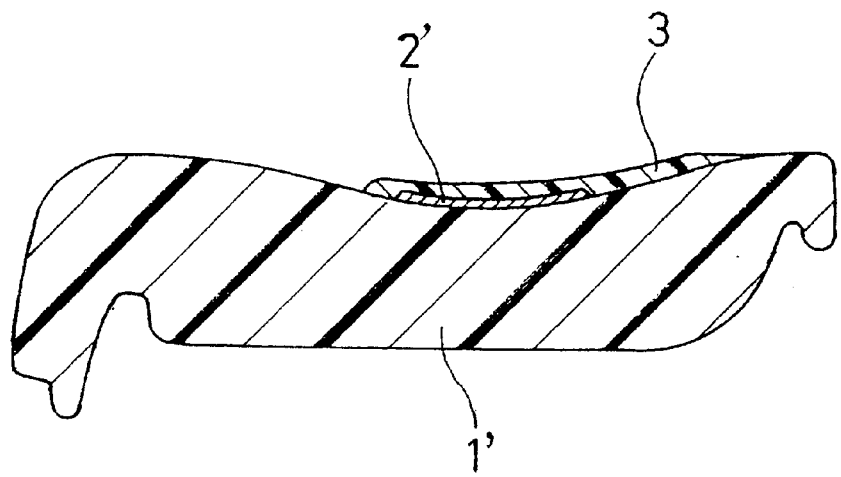
FIG. 5 is a sectional view showing a conventional example.
Figure 6:
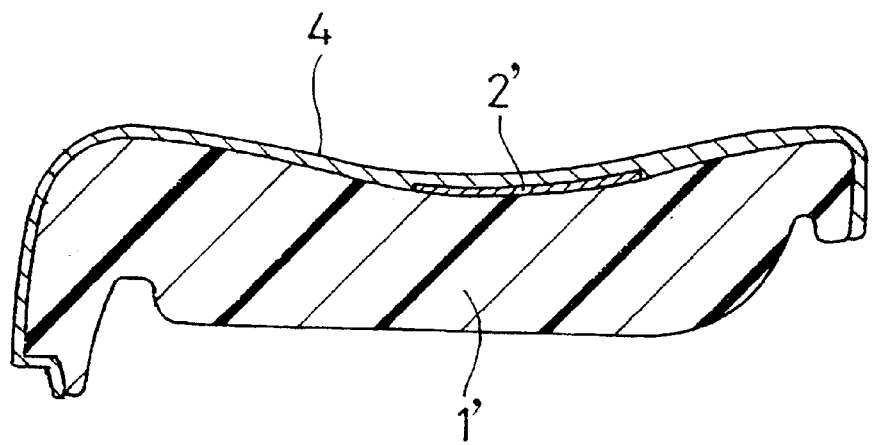
FIG. 6 is a sectional view showing another conventional example.

In the embodiment shown in FIGS. 3a and 3b, the pad 1 may be entirely wrapped with a cover 8 as shown in FIG. 4.

According to the present invention, examples of material of the pad 1 include polyurethane foam and thermoplastics resin fibers (e.g. polypropylene, polyethylene, and polystyrene), just like the conventional example. Examples of material of the cover 8 shown in FIG. 4 include leather, polyvinyl chloride, moquette, and the like. Employed as the sensor 2 may be a pressure sensitive sensor wherein the electrical resistance is changed by pressure or a strain gage, just like the conventional example.

Though the slit 7 is formed to extend forward from the rear end of the pad 1 in the embodiment shown in FIGS. 3a and 3b, the slit 7 may be formed to extend from the front end or side toward the center of the pad 1 in case that the cover 8 wraps the pad 1 as shown in FIG. 4.

As mentioned above, in the seat with the seat sensor according to the present invention, the sensor is disposed inside the pad so that the occupant never feel bad touch even when the occupant sits down on the pad above the sensor. This structure can eliminate the necessity of providing a slab or a laminate on the top of the pad, thereby facilitating the manufacture of the seat with seat sensor and thus extremely reducing the manufacturing cost.

What is claimed is:

1. A seat with a seat sensor, comprising:

a pressure sensitive sheet sensor for sensing a pressure having a terminal and a cable for connecting the sheet sensor and the terminal, and a seat pad for allowing a user to sit thereon, said seat pad having a slit extending horizontally from a rear peripheral side of the seat pad to a middle area of the seat pad, said slit having a width and a height to allow the sheet sensor to enter from the rear peripheral side to the middle area thereof so that the sheet sensor is disposed inside the seat pad, and the terminal projects from the rear side of the seat pad.

2. A seat with a seat sensor according to claim 1, further comprising a cover for covering the seat pad.

\* \* \* \* \*